Patented Dec. 18, 1951

2,579,428

UNITED STATES PATENT OFFICE 2,579,428

PARASITICIDAL COMPOSITION

Oscar H. Hammer, South Haven, Mich., assignor to The Dow Chemical Company, Midland, Mich., a corporation of Delaware No Drawing. Application February 2, 1949, Serial No. 74,237

2 Claims. (Cl. 167—30)

This invention relates to parasiticide materials and is especially directed to an improved toxicant composition which is non-injurious to plants and plant parts and particularly effective against mite organisms.

Mites are a problem to agriculturists generally. *Paratetranychus pilosus* (European red mite), *Tetranychus bimaculatus* (two-spotted spider mite), *Bryobia sp*. and other related mite organisms are widely distributed throughout the world, and in the United States are known to attack many varities of trees including apple, sweet and sour cherry, pear, peach, plum, prune, quince, and citrus. In addition, mites cause much damage to several varieties of "small fruit" plants such as raspberry, strawberry and currans; to ornamentals such as spruce, to flowering shrubs such as roses; and to beans and certain other vegetable plants. Few insect pests cause greater damage to so wide a range of plant growth as do the mites and spider mites.

As might be expected, a considerable assortment of parasiticidal materials have been developed and exploited for the control of mite organisms. Because of the variety of plant hosts concerned, the wide range of tolerance of such hosts to the common acaricides, problems of toxic residues, and the like, no currently available material has been found entirely satisfactory. The greater reproductive capacity of mite organisms complicates their control. Thus, an acaracidal material adapted to accomplish the quick kill and control of adult mites may be entirely unsatisfactory because of its poor residual activity.

The problem of mite damage to fruit trees has been aggravated in recent years by the increased popularity of the so called DDT type parasiticides. These materials are very effective against many common orchard insects but singularly specific in their failure to control mites. DDT and closely related toxicants appear to kill off the beneficial predatory organisms which normally aid in keeping mite infestation within reasonable bounds. With this upset of biological balance, mites are now a major problem in many areas where they previously were of small importance. The need for improved control methods and compositions is evident.

I have discovered that the combination of di-(4-chlorophenoxy)-methane and 4-chlorophenyl 4-chlorobenzene sulfonate constitutes a preferred parasiticidal composition for the control of mite organisms, and that in such composition the compounds are mutually activating to accomplish a synergistic result. The combination, when compounded with a suitable carrier in spray and dust compositions, exerts a prolonged residual action, is more toxic to mite organisms than either constituent alone, and at parasiticidal concentrations appears to be lacking in the phytocidal action which characterizes so many known acaricidal materials.

In operating in accordance with the present invention, the new toxicant mixtures are commonly employed along with a carrier in the form of spray and dust compositions. Also, a mixture of toxicants may be so compounded as to produce insecticidal concentrates adapted subsequently to be used in the preparation of spray or dust mixtures.

In the preparation of sprays, the toxicants may be separately dispersed in the water or other carrier. Alternately, the di-(4-chlorophenoxy)-methane and 4-chlorophenyl 4-chlorobenzene sulfonate may be mixed one with the other and the resulting mixture dispersed in water or other liquid carrier. If desired, an organic solvent may be employed as the carrier with the toxicants dissolved therein.

In the preparation of dusts, the toxicant mixture or the toxicants separately may be ground or mixed with the finely divided carrier in any suitable manner. A convenient mode of operation comprises dissolving the toxic mixture in a volatile organic solvent, wetting the finely divided carrier with the solution and thereafter evaporating the solvent out of the mixture. Suitable solvents for use in such operation include acetone, carbon tetrachloride, benzene, toluene, xylene, and the like.

In the preparation of concentrates, mixtures of the toxicants may be ground with suitable wetting and dispersing agents to obtain products adapted to be dispersed in water or other liquid carrier. Alternately, the toxicants may be separately compounded in concentrate form and mixed together upon dilution in the spray tank or otherwise.

The toxicants also may be dissolved in a water-miscible liquid to produce a concentrate adapted subsequently to be incorporated into aqueous spray mixtures. A further type of concentrate consists of a dispersion of the toxicant mixture in a finely-divided solid carrier, with or without emulsifier and dispersing agent. In such mixture a high percentage of the toxicant or toxicants is employed, and the product may be subsequently dispersed in water to produce aqueous spray mixtures or further diluted with finely divided carrier to produce dusts.

Any suitable proportion of the di-4-chlorophenoxy methane may be employed in combination with the 4-chlorophenyl 4-chlorobenzene sulfonate. The preferred amounts of materials are dependent upon the type of composition in which the toxicant mixture is to be applied, the nature of the organism to be controlled, the degree of infestation of the plant or tree, and the period for which residual action and control are desired. In general, from about 0.5 to 10 parts by weight of di-4-chloropenoxy-methane is employed for each part of 4-chloropenyl 4-chlorobenzene sulfonate. Within this range, the compounds appear to exercise a mutual activation one for the other so that compositions containing the mixture are characterized by an effectiveness against plant parasites which is greater than additive, and further exert a prolonged residual action.

The amount of the toxicants employed in spray mixtures may vary, but in general from about 0.3 to 1.0 pound of actual toxicant mixture per 100 gallons of water or other liquid carrier gives good results. In dust compositions the actual toxicant content should be at least about 0.03 to 5.0 per cent by weight of the ultimate composition. Depending upon whether a concentrate is in the form of a solution, dust dispersion, or simple mixture of the toxicants with wetting and dispersing agents, from about 5 to about 98 per cent by weight of the toxicant mixture may be employed therein.

Any suitable wetting, emulsifying, or dispersing agent may be used with the toxicant mixture provided only that it accomplish the end desired and not be reactive with the other ingredients of the composition. Representative products which have been found satisfactory include sodium lauryl sulfate, di-octyl sodium sulphosuccinate (Aerosol OT), polyethylene glycol-phenyl-isooctyl ether (Triton X-100), polyoxyalkylene derivatives of sorbitan trioleate (Tween 85), etc.

In the preparation of liquid concentrates, water-miscible solvents such as alcohol, acetone, dioxane, and the like are conveniently employed. In spray compositions, the toxicant mixture may be dispersed or dissolved in oil-water emulsion compositions, alcohol, acetone, chlorinated hydrocarbons, kerosene, conventional spray oils and the like, instead of water.

Solid carriers which may be employed in the preparation of dust or concentrate products include diatomaceous earth, clays, talc, charcoal, wood flour, pyrophyllite, volcanic ash, and the like.

As regards the persistency of the residues from the toxicant mixtures of the present invention, the new compositions are believed unique. In field determinations, single and thorough applications of the toxicant mixtures have been found to deposit residues which though exposed to all manner of weathering and possible reinfestation, accomplish effective control of mite populations for as long as 60 to 90 days. Such prolonged residual action is not characteristic of most commercial acaracides.

A further advantage of the new composition consists of the non-phytocidal nature of residues thereof as deposited on plant surfaces. Applications of the new toxicant mixture in conventional formulations and under a wide variety of climatic conditions have failed to produce undesirable plant responses.

A similar favorable situation is found as regards toxicity of the mixture to warm blooded animals. In concentrations and amounts where many parasiticidal mixtures have a high toxicity to animals, the toxicant mixture of the present invention is substantially innocuous.

The compound 4-chlorophenyl 4-chlorobenzene sulfonate is a white crystalline solid melting at 81°–89° C.

The following examples illustrate the invention but are not to be construed as limiting.

EXAMPLE 1

40 parts by weight of di-(4-chlorophenoxy)-methane, 1 part of a sodium alkyl sulfate (IN531), 2 parts of a sodium aryl-alkyl sulfonic acid product (Daxad No. 27), and 57 parts of attapulgite clay (Diluex) were mixed and ground together to form a parasiticide concentrate hereinafter referred to as "Composition A."

Similarly, 40 parts by weight of 4-chlorophenyl 4-chlorobenzene sulfonate was mechanically mixed with 1.5 parts of alkyl aryl sufonate (Nacconal NR), 2 parts of sodium aryl-alkyl sulfonic acid product (Daxad No. 27) and 56.5 parts of attapulgite clay (Diluex) to form a concentrate identified as "Composition B."

Compositions A and B as above described were applied in aqueous dispersions both alone and in combination for the control of European red mite and two-spotted spider mite on mature apple trees. The spray was employed in a pre-pink application with conventional mechanical spray rigs to trees of the "red delicious" variety on April 27th. At this time the flower buds were swollen and the trees on the verge of breaking into bloom. The trees were heavily infested with mite eggs and nymphs and immediately adjacent to unsprayed check plots which provided a continuous source of reinfestation. The following table sets forth the amounts of materials employed and the parasiticidal results obtained:

Table A

| Pounds Composition per 100 gallons spray | | Average number mites per leaf on | | |
|---|---|---|---|---|
| Composition A | Composition B | May 23 | July 6 | Aug. 1 |
| 2.5 | | 0.04 | 0.5 | 32.5 |
| | 2.5 | 0.0 | 0.08 | 21.9 |
| 1.25 | 1.25 | 0.0 | 0.08 | 15.0 |
| (Check) | | 0.9 | 41.3 | 38.0 |

No bud, blossom or leaf injury or formative effects resulted from any of the applications. The trees in the check plots were very heavily infested by mite organisms throughout the growing season, and contributed to a rapid reinfestation and heavy build up of mite population on adjacent trees subjected to conventional mite control treatments.

EXAMPLE 2

In similar fashion Compositions A and B and a combination of A and B were applied in aqueous dispersion as summer sprays to bearing apple trees of the Northern Spy variety. These trees had received a conventional dormant, delayed dormant, etc. spray schedule but had built up a heavy summer population of European red mite and two-spotted spider mite which threatened to interfere with the development and ripening of the crop. The applications were made on July 19th following the taking of prespray counts of mites thru the several sections of the orchard. The following data are representative:

the combination of compositions C and D in aqueous dispersion.

*Table B*

| Pounds Composition per 100 gallons spray | | Average number mites per 100 leaves on— | | | | |
|---|---|---|---|---|---|---|
| Composition A | Composition B | Prespray count July 19 | July 27 | Per Cent control | Aug. 7 | Per Cent control |
|  | 2.5 | 700 | 70 | 90 | 40 | 93.5 |
| 2.5 |  | 1,950 | 260 | 86.7 | 140 | 92.8 |
| 1.25 | 1.25 | 3,590 | 20 | 99.5 | 20 | 99.5 |
| (Check) |  | 3,550 | 4,960 |  | 3,890 |  |

In this series of applications, no tree or leaf injury was observed attributable to the toxicant mixture in the spray compositions. In fact, the foliage of all sprayed trees exhibited good color and a thrifty appearance throughout the season. The foliage of unsprayed check trees became yellowish in color and the trees had undergone appreciable defoliation by the first of August.

EXAMPLE 3

43 parts by weight of di-(4-chlorophenoxy)-methane, 49 parts of attapulgite clay (Diluex), 5 parts of bentonite, 0.5 part of sodium arylalkyl sulfonic acid product (Daxad No. 27), and 2.5 parts of polyethylene glycol phenyl isooctyl ether (Triton X-100) were ground together to produce a parasiticide concentrate identified as "Composition C."

A further concentrate was obtained by mixing and grinding together 40 parts by weight of 4-chlorophenyl 4-chlorobenzene sulfonate, 51.5 parts of attapulgite clay (Diluex), 7.5 parts of bentonite, 0.5 part of a partially desulfonated sodium lignosulfate (Marasperse CB), and 0.5 part of polypropylene glycol (molecular weight 1200). This was identified as "Composition D."

The foregoing compositions both alone and in combination one with the other were applied in aqueous dispersion with conventional commercial spray equipment as summer sprays to several groves of mature Bartlett pear trees. These trees were of medium size, completely foliated, and had a light set of fruit. Two-spotted spider mite was not present in the groves in significant numbers at the time of spraying, but past experience indicated the probability of the development of high populations later in the season.

In this operation, the several spray materials were applied at the rate of approximately 12 gallons per tree, and the trees received no other treatment. The following table sets forth the results obtained:

*Table C*

| Pounds Composition per 100 Gallons spray | | Average Number of mites per leaf after interval— | | |
|---|---|---|---|---|
| Composition C | Composition D | 26 days | 47 days | 68 days |
| 2.0 |  | 0 | 0 | 0.5–1 |
|  | 1.0 | 0 | 0 | 4–10 |
| 1.0 | 0.5 | 0 | 0 | 1–3 |
| (Check) |  | 1–3 | 1–3 | 10–25 |

The control trees had suffered such mite injury at the 68 day interval after spraying as to be 25–50 per cent defoliated. No foliage injury attributable either to the mites or to the toxicant mixture was observed on those trees sprayed with

EXAMPLE 4

Compositions C and D as described in the preceding example were similarly employed as petal-fall sprays for the control of European red mite and clover mite (*Bryobia praetiosa* Koch) on mature Bartlett pear trees. The bloom was still on the trees but was decreasing and the leaf buds were just beginning to open. Very heavy deposits of mite eggs were observed on the old wood of the trees and a few mites in proto-nymph stage were present.

In this operation, the compositions were applied in aqueous dispersion and at approximately 9 gallons per tree with conventional mechanized ground spray rigs. Check plots were distributed throughout the orchards.

The application of the spray mixtures was followed within a week or 10 days by airplane dusting with a commercial Bladen type dust mixture to insure the protection of the crop from the very heavy mite populations developing in the check areas. Bladen contains as the active toxic constituent hexaethyltetraphosphate and is known to be an effective contact parasiticide, but to have no residual effect, and to be ineffective against mite eggs. Accordingly, in the subsequent counts of foliage samples from the test plots, the presence of dead Bryobia was interpreted as indicative of the degree of success or failure of the initial application of Compositions C and D to destroy the eggs existent at the time of spraying, and the residual action of the spray residues.

121 days after the application of Compositions C and D, several hundred leaves were selected at random from each of the test and check plots and examined to determine the presence of dead Bryobia, live adult European red mites, and viable eggs of both European red mites, and Bryobia. The following table summarizes the results observed:

| Pounds of Composition per 100 gallons | | Average number per leaf | | |
|---|---|---|---|---|
| Composition C | Composition D | Dead Bryobia | Live red mite adults | Viable eggs of Bryobia and European red mite |
|  | 0.5 | 3–10 | 0.1–0.5 | 1–3 |
|  | 1.0 | 0.1–0.5 | 0.1–0.5 | 0.5–1.0 |
|  | 2.0 | 0.1–0.5 | 0 | 0.1–0.5 |
| 1.0 |  | 10–25 | 0 | 0.5–1.0 |
| 1.5 |  | 3–10 | 0.1–0.5 | 1–3 |
| 2 |  | 1–3 | 0.1–0.5 | 0.5–1 |
| 1 | 1 | 0 | 0 | 0.1–0.5 |
| 1.5 | 0.5 | 0 | 0 | 0 |
| (Check) |  | 10–25 | 1–3 | 10–25 |

No foliage or tree injury attributable to the application of the combination of toxicants was observed. Mite injury on the check trees resulted in yellowing of the leaves and partial defoliation.

I claim:

1. A composition for the control of mites and spider mites comprising di-(4-chlorophenoxy)-methane and 4-chlorophenyl 4-chlorobenzene sulfonate in such proportions as to be mutually activating, the di-(4-chloro-phenoxy)-methane being present in the amount of from 0.5 to 10 parts by weight for each part by weight of 4-chlorophenyl 4-chlorobenzene sulfonate.

2. An aqueous spray composition for the control of mites and spider mites comprising a dispersion of di-(4-chlorophenoxy)-methane and 4-chlorophenyl 4-chlorobenzene sulfonate in association with a finely divided solid carrier and a wetting and dispersing agent, the di-(4-chlorophenoxy)-methane being present in the amount of from 0.5 to 10 parts by weight for each part by weight of 4-chlorophenyl 4-chlorobenzene sulfonate.

OSCAR H. HAMMER.

REFERENCES CITED

The following references are of record in the file of this patent:

UNITED STATES PATENTS

| Number | Name | Date |
|---|---|---|
| 2,330,234 | Moyle | Sept. 28, 1943 |

OTHER REFERENCES

Metcalf, J. Econ. Ent., vol. 41, No. 6, December 1948, pp. 875–882.

Lauger et al., Helv. Chim. Acta., vol. 27, pp. 892–908.

Certificate of Correction

Patent No. 2,579,428 December 18, 1951

OSCAR H. HAMMER

It is hereby certified that error appears in the printed specification of the above numbered patent requiring correction as follows:

Column 1, lines 16 and 17, for "currans" read *currants*; line 30, for "greater" read *great*; column 4, line 6, for "81°–89° C." read *81°–83° C.*; and that the said Letters Patent should be read as corrected above, so that the same may conform to the record of the case in the Patent Office.

Signed and sealed this 6th day of May, A. D. 1952.

[SEAL]

THOMAS F. MURPHY,
*Assistant Commissioner of Patents.*